(12) United States Patent
Erden et al.

(10) Patent No.: US 8,873,178 B2
(45) Date of Patent: Oct. 28, 2014

(54) STORING RANDOM AND SEQUENTIAL DATA ON DIFFERENT TRACK WIDTHS OF A RECORDING MEDIUM

(75) Inventors: Mehmet Fatih Erden, St. Louis Park, MN (US); Mourad Benakli, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 136 days.

(21) Appl. No.: 13/569,596

(22) Filed: Aug. 8, 2012

(65) Prior Publication Data

US 2014/0043708 A1 Feb. 13, 2014

(51) Int. Cl.
*G11B 20/10* (2006.01)
(52) U.S. Cl.
USPC .............................................. 360/39
(58) Field of Classification Search
None
See application file for complete search history.

(56) References Cited

U.S. PATENT DOCUMENTS

| | | | |
|---|---|---|---|
| 7,126,890 B2 | 10/2006 | Learned et al. | |
| 7,636,219 B2 | 12/2009 | Ikegami et al. | |
| 7,643,235 B2 | 1/2010 | Erden et al. | |
| 7,813,066 B2 | 10/2010 | Nakagawa et al. | |
| 7,982,994 B1* | 7/2011 | Erden et al. | 360/55 |
| 8,300,339 B1* | 10/2012 | Nangare et al. | 360/39 |
| 8,599,508 B1* | 12/2013 | Burd | 360/39 |
| 8,638,513 B1* | 1/2014 | Burd | 360/39 |
| 2002/0071198 A1* | 6/2002 | Liu et al. | 360/77.02 |
| 2013/0194689 A1* | 8/2013 | Takai | 360/31 |
| 2013/0194699 A1* | 8/2013 | Matsuo et al. | 360/77.08 |
| 2013/0250447 A1* | 9/2013 | Erden | 360/51 |

\* cited by examiner

*Primary Examiner* — Wayne Young
*Assistant Examiner* — Mark Fischer
(74) *Attorney, Agent, or Firm* — Hollingsworth Davis, LLC

(57) ABSTRACT

Host data to be written to a recording medium is categorized as one of sequential data or random data. The sequential data is written to a first track width on the recording medium. The random data is written to a second track width on the recording medium, the second track width being larger than the first track width.

20 Claims, 6 Drawing Sheets

STORING RANDOM AND SEQUENTIAL DATA ON DIFFERENT TRACK WIDTHS OF A RECORDING MEDIUM

SUMMARY

The present disclosure is related to systems and methods that facilitate storing random and sequential data on different track widths of a recording medium. In one embodiment, host data to be written to a recording medium is categorized as one of sequential data or random data. The sequential data is written to a first track width on the recording medium. The random data is written to a second track width on the recording medium, the second track width being larger than the first track width.

These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

DETAILED DESCRIPTION

Figure 1:
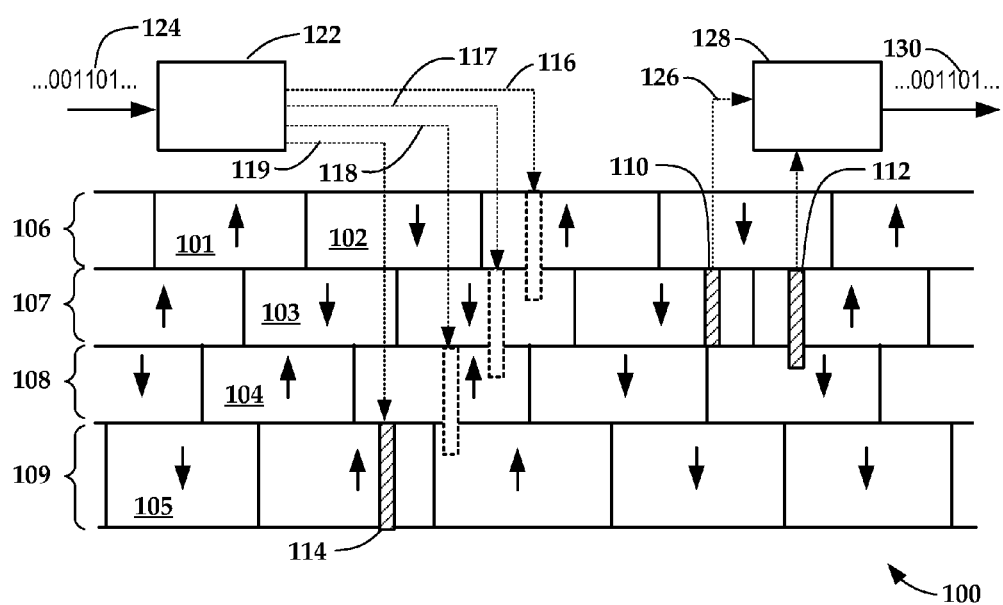
FIG. 1 is a block diagram illustrating a magnetic media using shingled architecture according to an example embodiment.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to magnetic data recording, such a used in hard disk drives (HDDs) and similar devices. Magnetic drive architectures often use perpendicular magnetic recording technology to store data on the magnetic medium. Perpendicular recording can provide more than three times the areal density (AD) for data storage than the previous generation, longitudinal recording architectures. Perpendicular recording and other enhancements have allowed hard drives to steadily increase data storage density over the past decades. However, additional technology advances may be needed to continue this pace of growth.

The theoretical maximum AD of perpendicular recording architectures is bounded by what is known as the superparamagnetic limit. The superparamagnetic limit relates to the tendency of magnetic grains to randomly flip magnetic orientation in response to thermal fluctuations. The superparamagnetic limit defines a lower bound on the area in which an individual bit can be reliably stored. As a result, existing perpendicular recording technologies can only be scaled down so much before being restricted by superparamagnetic limit of currently used magnetic media.

There are some future technologies proposed to address the superparamagnetic limit. For example, heat assisted magnetic recording (HAMR) uses an energy source such as a laser to heat a spot on a high coercivity medium to locally reduce coercivity during recording. Another proposed technology, bit patterned media (BPM) recording, involves patterning the media via nanolithography to form magnetic cells used to store bits of data. Both HAMR and BPM are intended to break the paramagnetic limit and continue to increase AD. However, it will be challenging to develop either of these two technologies to in the desired time frames, e.g., having market-ready products that maintain the desired cumulative annual growth rate (CAGR) of hard disk AD.

For this reason, the magnetic recording industry is looking for ways to increase AD without major technology and design changes until newer technologies can be established. For example, shingled recording promotes drive architectures different from the ones in use today, and has been introduced for reaching desired CAGR goals. Shingled recording involves writing tracks that overlap part of previously written tracks. This can result in narrower tracks, thereby increasing AD. However, shingled recording has performance penalties when performing random writes. This is because changing a portion of a track may mean rewriting all of the overlapping tracks where the randomly-updated data is located, which could include a significant amount of data, depending on the track configuration.

Conventional magnetic recording is sometimes categorized as a one-dimensional (1-D) architecture, even though a magnetic recording surface is, in principle, a two-dimensional (2-D) system. For example, grains on the media surface are not formed based on specific direction assumptions, and performance of the magnetic grains does not depend which direction is along-track and which direction is cross-track. Conventional magnetic recording systems generally constrain an inherently 2-D system to 1-D system in attempt to reduce system cost and complexity. For example, the following system specifications may generally pertain to a 1-D recording system: 1) only one write-head and one read-head is used for a given magnetic surface; 2) the storage device is generic, with simple controller functionality which supports any kind of request from upper data management, ranging from random reads and/or writes to sequential reads and/or writes; 3) no tiered storage or hybrid architectures 4) the mechanical and electrical critical-to-quality (CTQ) attributes of the device are optimized to reduce overall system latency while AD is maximized.

The mechanical design constraints of modern hard drives are tighter than the ones required for electrical design. As a result, the item 4) listed above indicates that the design should reduce servo seek time (e.g., system latency) considerably, and this combined with the item 1) suggests that the Bit Aspect Ratio (BAR) of the design should be larger than one. In order to increase AD, then, one design goal is to maximize the linear density. To maximize linearly density, the write-head is designed to deliver the maximum field without hurting the track density. Further, the read-head cross-track profile should be narrow enough in order not to pick any side track interferences while establishing a good reader signal-to-noise ratio (SNR) and system resolution. Items 2) and 3) restrict the system to have just enough intelligence to write and organize the bits accordingly on the media surface.

The result of these system constraints is that the conventional drive architectures today are 1-D recording and playback systems. Generally, such systems focus on resolving bits along a single direction (along-track) with guard bands in the cross track direction to minimize cross-track interference. Therefore, in order to increase AD, these systems require reducing one or both of along-track bit size and track width, while still having provisions (e.g., guard bands) that reduce cross track interference. Both HAMR and BPM recording technologies target higher AD assuming this conventional 1-D drive architecture.

The general system specification items 1)-4) described above are being further explored to see if the current technology at hand can support higher AD numbers if some of those specifications are modified. Shingled recording is a result of such explorations, and targets higher AD numbers by loosening the second and third items above. As will be described below, a shingled recording system may allow for tiered storage to provide acceptable random write performance, which differentiates from the items 2) and/or 3) described above that may be characteristic of a 1-D storage system. These adaptations may also affect the item 4), in that some tradeoff between latency and complexity of tiered storage may be involved.

The effective track pitch in today's conventional drives is defined by the write-head cross-track profile, which indicates that the smaller the effective cross-track width of the write-head the smaller the track pitch will be, thus resulting into higher track densities and higher AD numbers. However, if the cross-track width of the write-head is smaller, then the maximum attainable write-head field out of that head will be less. A lower write head field limits the maximum attainable linear density, which corresponds to AD. Shingled recording is a solution to break this dilemma by eliminating the direct relationship between the track pitch and the write-head cross-track profile.

For purposes of the present discussion, the terms "writer," and "write element" may be used to indicate that portion of the storage device (e.g., write pole) that generates the magnetic field applied to write data to the magnetic media. Similarly, the terms "reader" and "read element" may be used to indicate a magnetic sensor (e.g., a magnetoresistive stack) that detects magnetic fields recorded on the media. Terms such as "read head" and/or "write head" may be generally used to indicate the larger assembly (e.g., slider, head-gimbal assembly) that houses the reader/writer elements.

In reference now to FIG. 1, a block diagram illustrates a magnetic media using shingled architecture according to an example embodiment. The blocks (e.g., blocks 101-105) represent bits written in respective tracks 106-109 on a magnetic media surface 100. The arrows within the blocks represent respective magnetic orientations that will be sensed as ones or zeros by a reader, e.g., by read elements 110 or 112. The tracks are written by successive passes 116-119 of a writer, e.g., write element 114.

Each of the passes 116-119 represent spins of the disk. User data is written in the respective tracks 106-109 through multiple spins of the disk, partially over-writing the adjacent tracks at each spin. The resulting group (or band) of tracks can be generalized any number (n) of overlapping tracks, with n−1 narrow tracks and 1 wide track. The example in FIG. 1 includes three narrow tracks 106-108 and one wide track 109, and this may be extended to any number of narrow tracks. The wide track 109 corresponds to the full width of the write element 114. The other tracks 106-109, while initially written to the width of the write element 114, have a reduced width after being partially overwritten by subsequent tracks. Subsequent groups of tracks may be written next to the group of tracks 106-109, and each group may be separated by a guard band so that the groups can be individually written and rewritten without affecting neighboring groups.

The architecture in FIG. 1 includes an encoder 122 for receiving user data 124 and encoding into signals that are sent to the write element 114. Because each group of tracks 106-109 may store a significantly larger amount of data than minimum host addressable units (e.g., sectors) used in a conventional hard drive, the encoder 122 (or other drive components) may include features to enable using addressable units that are smaller than the group 106-109.

For example, the encoder 122 may include an atypically large cache for buffering data, so that the device can more effectively fill the group of tracks 106-109 in response to write requests for small units of data. The large cache allows delaying writing the data to the disk until enough data is available to efficiently fill the track group 106-109. The cache may also include non-volatile memory, so that buffered data is not lost upon unexpected loss of power. A controller (not shown) may also use a scheduler to facilitate delayed writing of the buffered user data via the encoder 122.

In the illustrated example, the read element 110 is scaled according to the widths of the narrow tracks 106-108. The signals 126 coming from the read element 110 are processed by a decoder 128, which provides decoded output data 130 to the host/user in response to read requests. The decoder 128 and read element 110 may utilize a 1-D read-channel architecture that is tuned to the operating conditions set by the shingled recording track layout. For example, the read element 110 width may be selected to correspond to the widths of the narrow tracks 106-108.

As can be seen in FIG. 1, shingled recording allows the final track pitch to be reduced for at least tracks 106-108 without changing the effective width of write element 114. This allows the write element 114 to deliver stronger magnetic fields, which increases linear density and track density, thereby increasing overall AD of the storage device. To read the data back, the 1-D read element 110 and decoder 128 arrangement is scaled to the narrower track width (e.g., width of tracks 106-108) to read the shingled track data without unacceptable adjacent track interference. This is a challenge, as currently employed magnetoresistive (MR) read elements exhibit significant loss of SNR when the cross-track dimensions are significantly reduced. Thus, is desirable to reduce track widths by shingle recording architecture without reader SNR and system resolution being degraded. Otherwise, any kind of interference coming from adjacent tracks may have a detrimental effect on the performance of the system.

Alternate read architectures are described herein that can utilize a read element 112 that is larger than the minimum track width, thereby allowing the read element 112 to maintain higher SNR than the narrower read element 110. The decoder 128 may have special provisions to deal with signals from multiple adjacent tracks being read at the same time. For example, a proposed system architecture may jointly utilize information written at adjacent tracks, thus resulting into further AD increase. For purposes of the following discussion, the proposed systems are grouped into two categories. The first category uses binary signal levels used today in most magnetic disk storage devices. The second category relates to multi-level signal levels proposed in commonly-owned U.S. Pat. No. 7,982,994, which is hereby incorporated by reference. These categories are further grouped into embodiments that respectively use single and multiple read elements.

Binary Signal Levels with a Single Read Element

A magnetic recording system is a natural binary-signal-level system because of two stable magnetization levels present for the magnetic materials. In this section, we will consider a binary architecture scenario to explain the architecture options. As described above, shingled recording is an arrangement of tracks that trades random write performance with AD increase. A relatively large band of tracks are written together by overlapping one track over another within the band. Accordingly, shingled recording systems may require adaptations in order to manage writes/updates of relatively small portions of stored memory that may occur in a random order. For example, the system may be designed with a predetermined number of tracks within each band to minimize the impact of random writes while still increasing AD. The system may also (or alternatively) utilize tiered storage (e.g., large non-volatile cache) to mitigate the random write performance hit while still increasing AD.

The drive architecture discussed in this section is based on one read element for a given media surface. Analogous to the effect of shingled writing on random write performance, this option may involve a tradeoff between random read performance and AD. More specifically, this option involves reading multiple tracks and processing the tracks jointly to account for interference between the tracks. This allows the read element to be wider than the track pitch, thereby increasing the track density. Compared to using a given reader design that is narrow enough to individually read the smaller tracks, joint processing of adjacent narrow tracks allows AD to be increased without compromising reader SNR or reader stability for the reader design. Similar to the use of a writer that is wider than the tracks being written in shingled recording, use of a read element that is wider than the tracks being read back eliminates the direct relationship between the track pitch and the read-head cross-track profile.

In the examples described in this section, any kind of write process can be used to form the tracks of data, including conventional write processes, shingled recording, HAMR, BPM, etc. The bits in adjacent tracks may be aligned, either during initial write, or later. This type of alignment is obtained utilizing a write synchronization solution proposed in commonly-owned U.S. Pat. No. 7,643,235, which is incorporated by reference herein. Tracks may be aligned among each other at a hardware or firmware level.

In one example configuration, user data is read by a read element that spans multiple tracks, each track producing a binary signal. Signals coming from multiple tracks are processed jointly to extract user information from one or both of the tracks. If only a single track is read by a read element (e.g., some of the tracks have widths corresponding to the read element's cross-track profile), signals coming from the read element may be processed using conventional read-channel architectures.

Figure 2A:
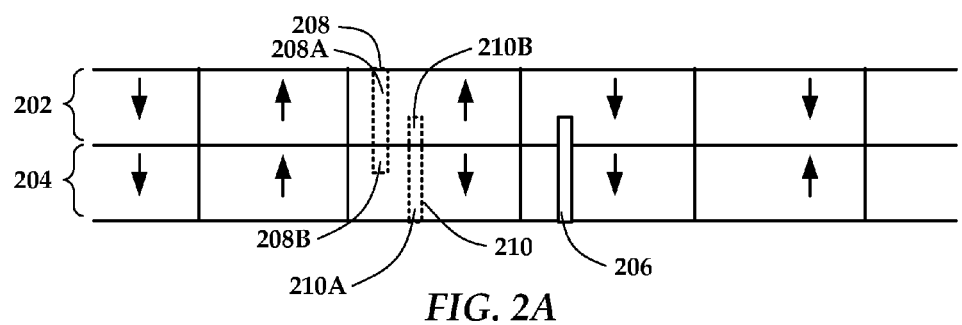
FIGS. 2A and 2B are block diagrams showing arrangements for reading binary-signal tracks according to example embodiments.
Figure 2B:
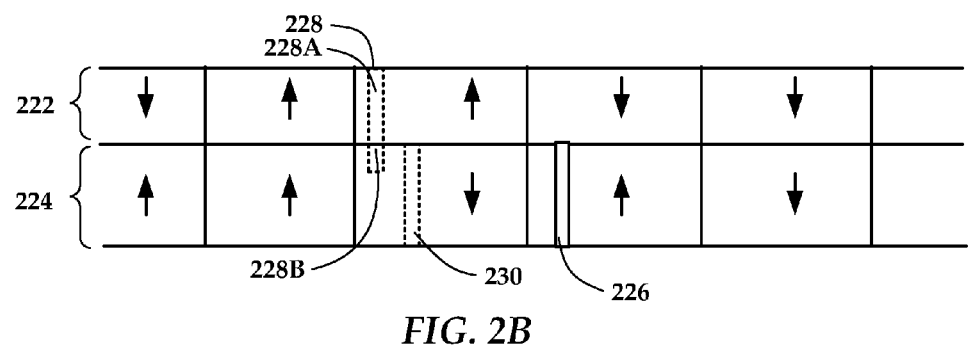

In FIGS. 2A and 2B, block diagrams show arrangements for reading binary-signal tracks according to example embodiments, each arrangement having different effects on random read performances. In FIG. 2A, two tracks 202, 204 are shown, both with approximately the same width. A reader assembly (e.g., slider or head-gimbal assembly) has a single reader 206 that is wider than the tracks 202, 204. The reader 206 makes two passes 208, 210 when reading either one or both of tracks 202, 204. On the first pass 208, the reader 206 obtains a first signal having one component 208A generated from a full width of track 202 and another component 208B generated from a partial track width of track 204. On the second pass 210, the reader 206 obtains a second signal having one component 210A generated from a full width of track 204 and another component 210B generated from a partial track width of track 202. The first and second signals are jointly processed to extract information either or both of the tracks 202, 204. It will be appreciated that this can be extended to any number of passes and concurrently read tracks.

Because the two tracks 202, 204 are configured as concentric rings, it takes two rotations of the disk to extract the written information from one or both of the adjacent tracks 202, 204. Thus, any random sector read request may have a latency of one extra rotation. This latency is in addition to other latencies of such a device, e.g., seek time of actuator arm. This additional latency may not be a significant penalty in some situations, e.g., sequential data that spans a large number of adjacent tracks. In such cases, a higher overall data transfer rate facilitated by the smaller tracks may offset any latency incurred while decoding the first/initial tracks.

In FIG. 2B, an alternate scenario is shown, with two tracks 222, 224 having different widths. A reader element 226 is wider than track 222, but not wider than track 224. As a result, the reader 226 only needs a single pass to read track 224, but still may need two passes 228, 230 when reading track 222. On the first pass 228, the reader 226 obtains a first signal having one component 228A generated from a full width of track 222 and another component 228B generated from a partial track width of track 224. On the second pass 210, the reader 226 obtains a signal generated from the full width of track 224. The first and second signals are jointly processed to extract information from track 222. If only track 224 is read, then single pass 230 is all that is required. As a result, there is no additional latency if only track 224 is read, but there may be an additional spin latency to read track 222.

As can be seen from FIGS. 2A and 2B, the AD of the first architecture in FIG. 2A is higher than that of FIG. 2B because of higher effective track density. For example, assuming widths of narrow tracks 202, 204, and 222 are about the same, the combined width of tracks 202, 204 is less than combined width of tracks 222, 224. However, the random read performance of the FIG. 2A configuration may be worse than the architecture in FIG. 2B, when averaged over all the individual tracks. The arrangement in FIG. 2B can be seen as a good compromise between the conventional drive architecture (e.g., all tracks are wide) and the one in FIG. 2A (all the tracks are narrow), where some random read performance may be sacrificed to provide an overall improvement in AD.

The arrangement shown in FIG. 2B can be adjusted to adapt to current or predicted use conditions. For example, a ratio of narrow tracks 222 to wide tracks 224 can be selected to adjust for better random read performance at the expense of AD. A shingled writing process can be used to produce such a mixture of narrow and wide tracks. The ratio may be predetermined during device design/setup, or may be dynamically variable, such that different bands of tracks may have different ratios of wide to narrow tracks, and the ratios may be occasionally adjusted based on conditions of use. It should be noted that bits in FIGS. 2A and 2B may be optionally be aligned with bits of adjacent tracks during a write process. If the bits are not aligned with bits of adjacent tracks during the write process, and relative alignment of the bits between the adjacent tracks may determined during the read process.

The arrangement shown in FIG. 2B may also be useful where a device can differentiate between random and sequential data. Sequential data generally refers to data (e.g., video) that is accessed by retrieving large blocks of data in some predictable order, e.g., the order it was written. Random data involves reading blocks, often of small size, that are accessed in an apparently random order from the viewpoint of the storage device. The differentiation of data into random and sequential may be performed in any number of ways, such as explicit host-to-storage communications, dynamic analysis of host commands, etc. In the latter case, a tiered storage arrangement (e.g., large non-volatile cache) may be facilitate analyzing usage patterns, as large blocks of data can be temporarily stored in the cache where usage patterns can be determined over a greater period of time before being written to the disk. At such time the data is moved from the cache to the magnetic disk, it may be apparent based on usage history whether such blocks are random or sequential. Generally, performance of an arrangement as shown in FIG. 2B can be optimized by placing sequential data in the narrow tracks 222, and random data in the wider tracks 224

Binary Signal Levels with Multiple Read Elements

Figure 3A:
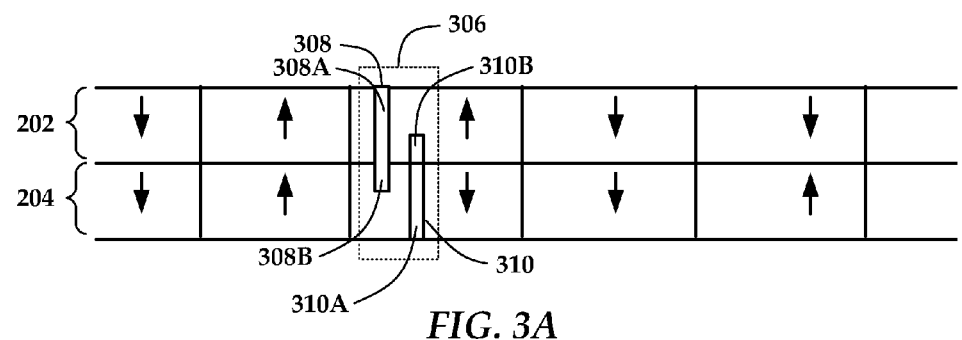
FIGS. 3A and 3B are block diagrams showing arrangements for reading binary-signal tracks with multiple read elements according to example embodiments
Figure 3B:
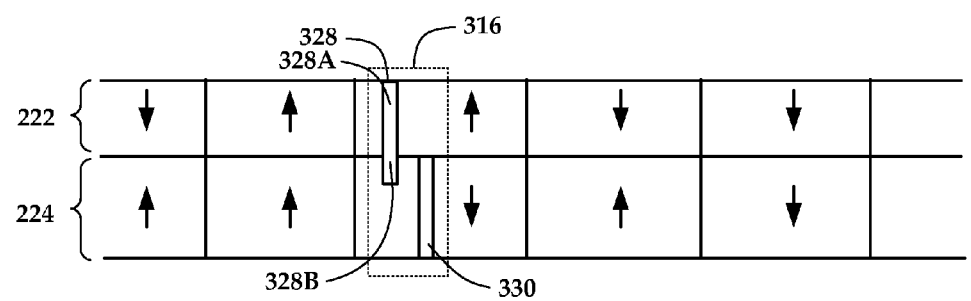

In FIGS. 3A-3B, block diagrams show arrangements for reading binary-signal tracks with multiple read elements according to example embodiments. The tracks 202, 204, 222, 224 in these figures may be similar to or the same as those described in FIGS. 2A-2B. In FIGS. 3A-3B, the tracks are read by multiple read elements that are provided on the same mounting structure, e.g., slider and/or head-gimbal assembly (HGA). For example, in FIG. 3A, two read elements 308, 310 are mounted in a common structure 306 and arranged to read respective tracks 202, 204 in a single pass. In FIG. 3B, two read elements 328, 330 are mounted on common structure 316 and arranged to read respective tracks 222, 224 in a single pass. It will be appreciated that the designs shown in FIGS. 3A-3B can be extended to any number of multiple read elements mounted to common structures and reading the respective number of tracks in a single pass.

The algorithms for the write process and the read process in FIGS. 3A-3B may be analogous to that described in relation to FIGS. 2A-2B. For example, first reader element 308 in FIG. 3A obtains a first signal having a one component 308A generated from a full width of track 202 and another component 308B generated from a partial track width of track 204. Second reader element 310 obtains a second signal having one component 310A generated from a full width of track 204 and another component 310B generated from a partial track width of track 202. The first and second signals are jointly processed to extract information either or both of the tracks 202, 204. Similarly, reader element 328 in FIG. 3B obtains two signal components 328A, 328B that are used in combination with a full track signal of reader element 330 to obtain data for track 222.

Because the arrangements in FIGS. 3A-3B can read two, jointly-processed signals from a single pass, these arrangements do not exhibit the latency issues explained in regards to the arrangements of FIGS. 2A-2B. As a result, the random read performance of the arrangements in FIGS. 3A-3B may be comparable to conventional drive architectures. Unlike the conventional architecture, the multiple reader element arrangements can read data written on adjacent track(s) in a single pass. This can provide up to twice the sequential read performance compared to a single read element, assuming the data being sequentially read spans adjacent tracks.

As noted above in the discussion of FIG. 2B, the track arrangement shown in FIG. 3B mitigates random read performance issues somewhat due to the ability to read the wider track 224 without a second pass. Similarly, the use of two read elements 328, 330 in the arrangement of FIG. 3B can reduce complexity in read-channel design architecture compared to that of the arrangement in FIG. 3A. Joint processing of the signals coming from read elements 308, 310 in FIG. 3A may require a 2-D equalizer and detector design. For the arrangement in FIG. 3B, the equalizer can be achieved with a conventional read channel detector for processing signals from read element 330. For processing signals from read element 328, a filter can be used to achieve inter-track interference cancelation, the filter being matched to a signal provided from the conventional detector that processes signals of the other read element 330. Thus, the architecture in FIG. 3B may represent a compromise between achievable system AD and system implementation complexity, instead of making tradeoffs with random read performance as shown in FIG. 2B.

Multi-Level Signal Levels

Figure 4A:
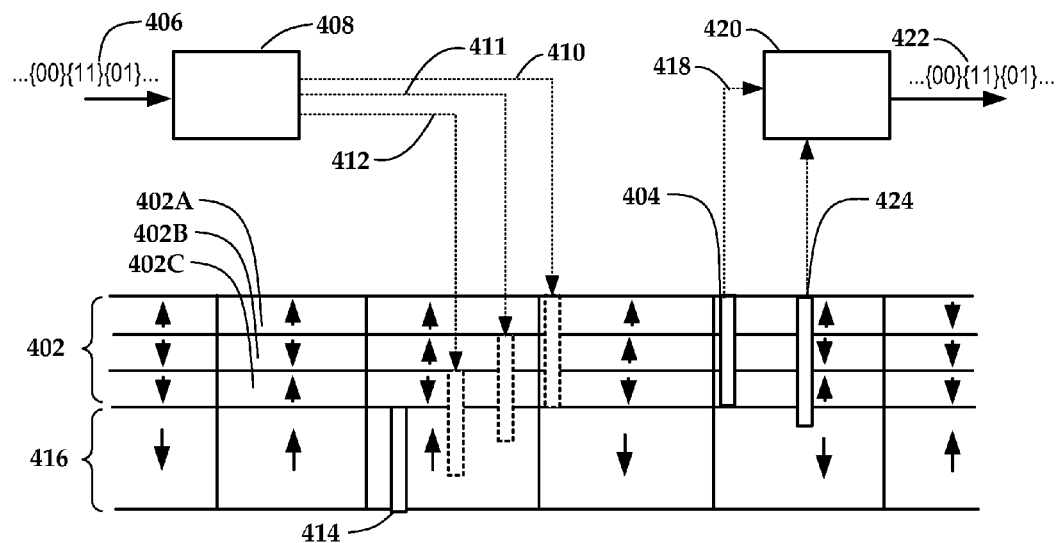
FIG. 4A is a block diagram illustrating a multi-signal-level track architecture according to example embodiment.

Conventional drive architectures utilizing binary signal levels assume a decrease in read element width commensurate with desired increases in track density (TD). To increase TD without scaling reader width further, multi-level signaling for magnetic recording may be used. A multi-level-signaling system is described in U.S. Pat. No. 7,982,994, which is incorporated herein by reference. An illustrative example of a multi-signal-level track architecture according to an example embodiment is shown in FIG. 4A. This example illustrates a track 402 of three binary-encoded subtracks that are read together by a read element 404 to provide a four-level output signal.

Generally, the read element 404 reads a signal which combines the magnetic values of the subtracks of 402, which can be resolved into four different values. For example, if the magnitude −1 is used to represent a signal level of negative bit and +1 is used to represent a signal level of a positive bit, then bit-pairs of data could be written to subtracks of the track 402 in one of the following combinations: (−1, −1, −1), (+1, −1, −1), (+1, +1, −1), (+1, +1, +1). The composite signal can be modeled as the sum of these values, resulting in composite signal levels −3, −1, +1, and +3 respectively. These four signal levels can be used to encode two bits, as indicated by brackets around pairs of user bits 406 being input into encoder 408.

The illustrated encoder may be configured as a 1-D encoder with extra cache memory, such as non-volatile cache. The encoder 408 transforms bit-pairs of the incoming data 406 into multi-track values, which are written on bit-aligned portions of track 402, such as represented by subtrack bit portions 402A-402C, which collectively store two bits of data. In the illustrated arrangement, the track 402 is written using a shingled write operation using three passes 410-412 of a write element 414, one for each subtrack. The write element 414 is wider than the individual subtracks within track 402. Use of the shingled write technique leads to a full-width final track 416 that may be used to store an additional track of binary signal data, or may be used as the basis for another multi-track group. Alternatively, the subtracks within track 402 may be written, e.g., using technologies such as HAMR or BPM, by a narrower write element (not shown) that is a fraction (e.g., ⅓) of the width of the track 402. In such a case, wider track 416 may not be written.

The track 402 is read back by read element 404, which provides a four-level signal 418 to a decoder 420. The decoder 420 decodes the signal 418 to provide a stream of estimated bit-pairs 422 as output. If the read element 404 is the same width as the track 402, the decoder 420 may be a 1-D decoder. However, as with other arrangements shown herein, a wider read element 424 may be utilized, in which case the decoder 420 may utilize 2-D encoding with either multiple passes of the single read element 424, or a single pass by a multi-read-element structure (see FIG. 4B).

Figure 4B:
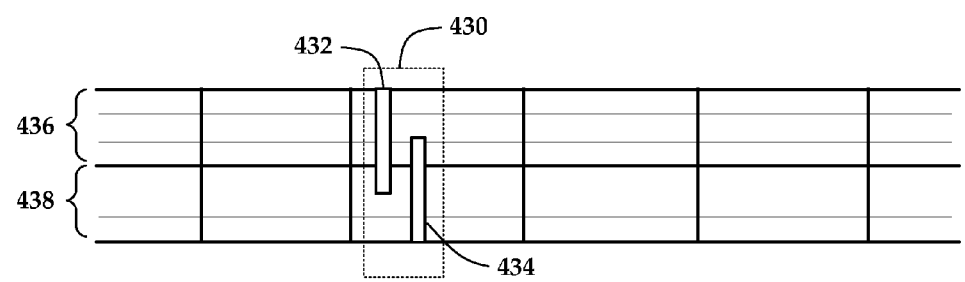
FIG. 4B is a block diagram illustrating a multi-signal-level arrangement with a multidimensional decoding scheme according to an example embodiment.

In FIG. 4B, a diagram illustrates a multi-signal-level arrangement using a multidimensional decoding scheme according to an example embodiment. A single structure 430 (e.g., slider and/or HGA) includes two read elements 432, 434. The elements are larger than tracks 436, 438 used to store multilevel information as described above. The tracks 436, 438 may correspond to an n-subtrack group (such as three-subtrack group 402 in FIG. 4A), and so each track 436, 438 may define multi-level signaling (e.g., four-level signaling as in FIG. 4A). The tracks 436, 438 of tracks are narrower than the read elements 432, 434, thus have the potential to provide higher track density compared to a single-track width, multilevel reader 404 of the same width. It will be appreciated that an alternate arrangement may use a single reader (e.g., reader 424 in FIG. 4A) that makes multiple passes.

The write process and the read process algorithms of the multiple-signal-level arrangements if FIGS. 4A and 4B are generally similar to the binary signal embodiments disclosed above. One difference is that alignment during the write process may be necessary for the multi-level architecture. Each reader 432, 434 (or each pass of a single reader) generates a signal from a full width of one track and a part of the neighboring track, and vice versa for the neighboring track. These signals can be jointly processed to estimate data from one or both tracks. One difference from the previous embodiments is that the joint processing involves processing two or more multiple-level signals to recover the user data instead of the conventional binary level signals.

The embodiments described above can be implemented as a system architecture that jointly utilizes information written at adjacent tracks, which results in AD increases compared to one-dimensional encoding/decoding. These embodiments can be applied to both conventional binary signal levels and to multi-level signals. The proposed architecture also provides a general design platform and can be applied to any technology, including from today's conventional perpendicular recording to future technologies like shingled recording, HAMR, BPM, etc.

Figure 5A:
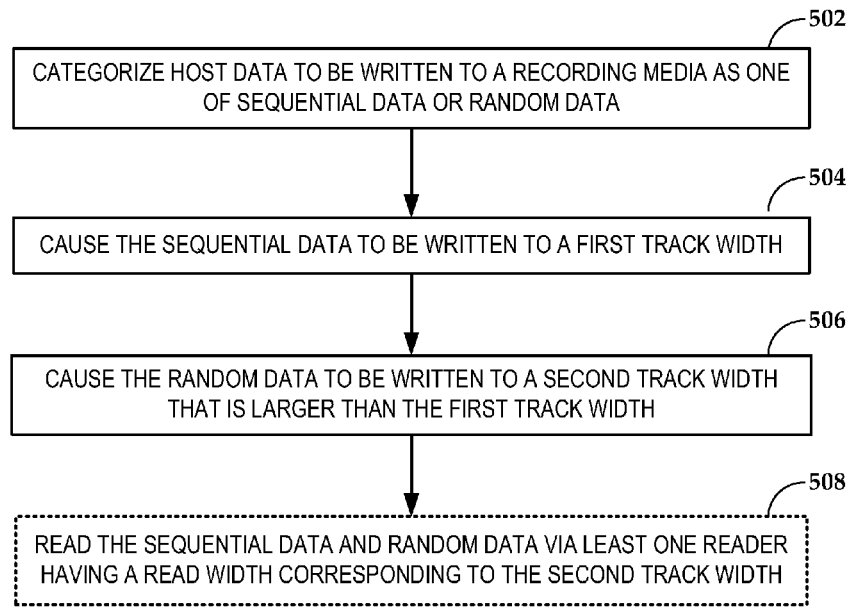
FIGS. 5A and 5B are flowcharts of procedures according to example embodiments.

In reference now to FIG. 5A, a flowchart illustrates a procedure according to an example embodiment. Host data to be written to a recording medium is categorized 502 as one of sequential data or random data. The sequential data is caused 504 to be written to a first track width, the random data caused 506 to be written to a second track width that is larger than the first track width. These operations 504, 506 may occur in any order, and may be substantially simultaneous (e.g., staggered dual write elements that overlay one track over another in a single pass). The tracks having the differing widths may be written as a shingled track pattern. The bits written to tracks on the recording media may be aligned with bits of adjacent tracks The procedure may optionally involve reading 508 the sequential data and random data via least one reader having a read width corresponding to the second track width. For example, the reader may read at least two adjacent tracks to read the sequential data, at least one of the adjacent tracks having the first track width. In order to read the random data, the reader may read a single track of the second track width.

The narrower (first track width) and wider (second track width) tracks may be adjacent, such that the two adjacent tracks include both narrower and wider tracks. In such a case, the tracks may be read during a single pass by two readers mounted on a common structure. A first of the readers reads the adjacent narrow and wide tracks and a second of the readers reads the wider track. The narrower track may be encoded by applying a filter matched to a signal generated by the first reader.

Figure 5B:
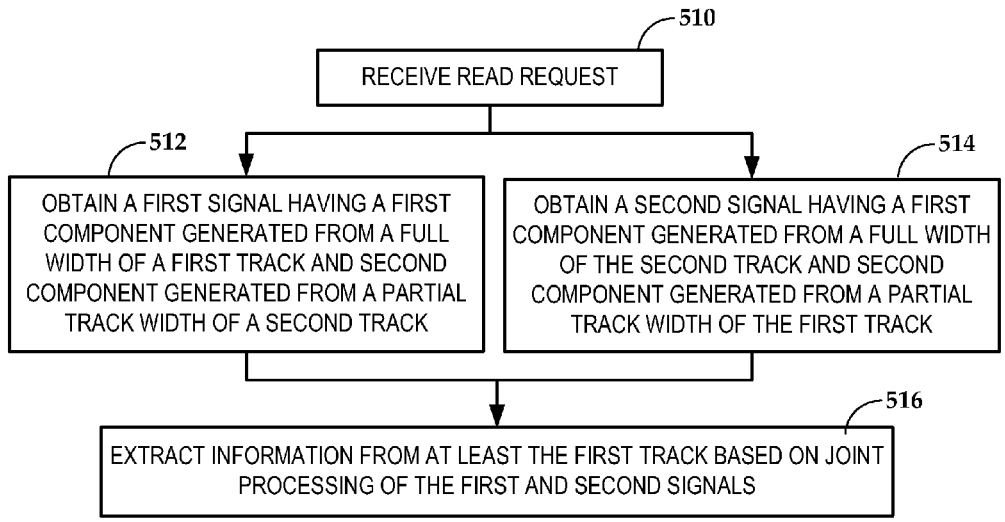

In reference now to FIG. 5B, a flowchart illustrates a procedure according to an example embodiment. In response to a read request 510 (e.g., host request), a first signal is obtained 512. The signal has a first component generated from a full width of a first track and second component generated from a partial track width of a second track. A second signal is obtained 514 that has a first component generated from a full width of the second track and second component generated from a partial track width of the first track. The first second signals obtained at 514, 516 may be provided by a single reader making two passes on the medium, or by dual-readers making a single pass on the medium. Information from at least the first track (and optionally the second track) is extracted 516 based on joint processing of the first and second signals.

The signals obtained at 514 and 516 may be sensed by one or more readers having an effective read width that is greater than a track width of the recording medium. For example, the reader may include first and second readers mounted to a common structure and arranged to obtain the respective first and second signals during a single pass over the medium. The recording medium may include a shingled track pattern with a relatively wider track width and a relatively narrower width. In such a case, the reader may have an effective read width corresponding to the relatively wider track width. In other configurations, the first and second tracks may each include two or more binary signal level tracks, and the reader generates a multiple level signal based on simultaneously reading the two or more binary signal level tracks. In any of these variations, the bits written to tracks on the recording medium may be aligned with bits of adjacent tracks.

Figure 6:
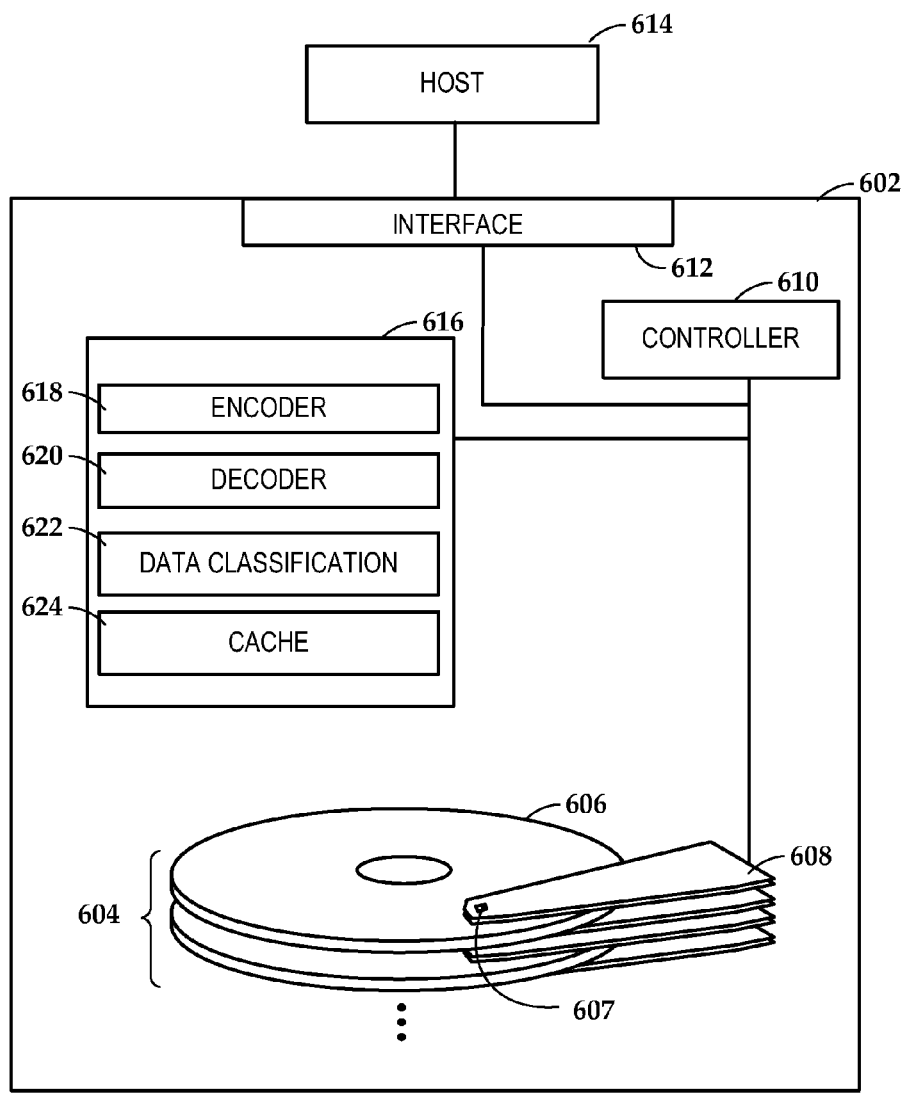
FIG. 6 is a block diagram illustrating an apparatus according to an example embodiment.

In reference now to FIG. 6, a block diagram illustrates an apparatus 602 according to an example embodiment. The apparatus 602 may be configured as a conventional or hybrid hard disk drive. The apparatus 602 includes a storage medium 604 that in this example includes one or more magnetic disks 606. The disks 606 store data as magnetic patterns that are read by transducers 607 (e.g., magnetic read/write elements) mounted on a pivoting arm assembly 608. There may be more than one read and/or write transducer 607 for each media surface, such as described in some embodiments above.

A controller 610 is coupled to the arm assembly for both controlling movement of the arm via an actuator (not shown) and sending and receiving signals to one or more read/write heads on the arms. The controller 610 may also provide other functions of the apparatus, such as controlling operations of a host interface 612 that communicatively couples the apparatus 602 to a host 614. The host interface 612 is a communications interface that allows the host 614 to store and retrieve information to/from the medium 604. The host interface 612 may utilize standard communication interfaces and protocols, such as SATA, SCSI, eSATA, SAS, USB, etc. The host interface 612 provides both a standard means of communication between the apparatus 602 and host 614, as well as abstracting operations of the controller 610 and media 606. For example, the host 614 may access data by way of logical block addresses (LBAs) that are mapped internally to a different physical addressing scheme, e.g., based on cylinders, heads, and sectors.

The apparatus 602 may include various features described herein to increase AD of data stored on medium 604. For example, the transducers 607 and controller 610 may write data in such a way as to increase track density. Those techniques, such as shingled recording, HAMR, BPM, multi-level signal recording, have been discussed in greater detail above. In order to take advantage of the data recording at these higher densities, the apparatus 602 may also include a number of functional modules 616 that facilitate reading back this data.

The functional modules may include any combination of discrete analog and digital circuits, general-purpose logic devices, firmware and/or software. Generally, these may each be operable via one or more processors, which may be part of or separate from the device controller 610. For example, an encoder 618 may receive host data, assemble the data into a format suitable for storage to the media, and encode the data as signals which are sent to transducers 607 for writing to the medium 604. A decoder 620 may have the ability to jointly process two or more signals corresponding to separately detected regions of the medium 604. This may include reading data from read elements 607 that span more than one data track, and jointly processing signals from adjacent tracks.

In some embodiments described above, the arrangement of data on the medium may be such that certain portions are used to store random data while other portions are used to store sequential data. A data classification module 622 may be able to make this determination, e.g., by examining usage patterns of the host 614, determining higher-level metadata, such as indicators of content, etc. This classification may also be used in conjunction with a cache 624. The cache 624 may include both volatile and non-volatile storage. Generally, it may be beneficial to determine whether data is random or sequential for purposes of storing to the cache 624, and these determinations may also be used when writing to the main storage medium 604. In addition, where the cache 624 is relatively large (e.g., configured as a non-volatile cache in a hybrid device), the data classification module 622 may have more historical/usage data for use in making random/sequential determinations than might be available based on recent activity at the host interface 612.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing error recovery in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
a processor capable of being coupled to at least one reader and at least one writer that respectively read data from and write data to a recording medium, the processor configured to:
 categorize host data to be written to the recording medium as one of sequential data or random data; and
 cause the writer to write the host data to the recording medium in a shingled pattern having wide tracks and narrow tracks, the sequential data being written to the narrow tracks and the random data being written to the wide tracks, wherein the at least one reader has a read width corresponding to the wide track, and wherein at least one of the wide tracks is overlapping at least one of the narrow tracks.

2. The apparatus of claim 1, wherein the processor is further configured to:
 cause the reader to read at least two adjacent tracks to read the sequential data, at least one of the adjacent tracks comprising one of the narrow tracks; and
 cause the reader to read the random data from the wide tracks.

3. The apparatus of claim 2, further comprising the at least one reader, wherein the at least one reader comprises first and second readers having a read width corresponding to the wide tracks mounted on a common structure, the first reader reading the at least two adjacent tracks and the second reader reading the wide tracks.

4. The apparatus of claim 3, wherein the processor is further configured to cause decoding of the narrow tracks by applying a filter matched to a signal generated by the first reader.

5. The apparatus of claim 1, wherein the processor is further configured to write bits to the wide and narrow tracks on the recording medium so that the bits are aligned with bits of adjacent tracks.

6. The apparatus of claim 1, wherein the processor is further configured to:
 write bits to the wide and narrow tracks on the recording medium so that the bits are not aligned with bits of adjacent tracks during a write process, and
 determine relative alignment of the bits between the tracks and the adjacent tracks during a read process.

7. The apparatus of claim 1, wherein the processor is further configured to establish a predetermined ratio of a numbers of the narrow and wide tracks during an initial configuration.

8. The apparatus of claim 1, wherein the processor is further configured to dynamically vary a ratio of numbers of the narrow and wide tracks based on conditions of use.

9. The apparatus of claim 1, wherein the processor is further configured to write the wide tracks and the narrow tracks in a plurality of bands, wherein each of the bands comprises n-overlapping tracks having n−1 of the narrow tracks and one of the wide tracks.

10. The apparatus of claim 9, wherein at least two of the bands comprise different ratios of numbers of the narrow and wide tracks.

11. The apparatus of claim 10, wherein the processor is further configured to dynamically vary the ratios based on conditions of use.

12. A method comprising:
 categorizing host data to be written to a recording medium as one of sequential data or random data;
 writing the host data to the recording medium in a shingled pattern having wide tracks and narrow tracks, such that the sequential data is written to the narrow tracks and the random data is written to the wide tracks, wherein at least one of the wide tracks is overlapping at least one of the narrow tracks.

13. The method of claim 12, further comprising reading the sequential data and random data via at least one reader having a read width corresponding to the wide track.

14. The method of claim 13, further comprising:
 reading at least two adjacent tracks via the reader to read the sequential data, at least one of the at least two adjacent tracks comprising the narrow track; and
 reading the wide track via the reader to read the random data.

15. The method of claim 12, further comprising reading the sequential data and random data via first and second readers having a read width corresponding to the wide track width mounted on a common structure.

16. The method of claim 12, further comprising establishing a predetermined ratio of numbers of the narrow and wide tracks during an initial configuration.

17. The method of claim 12, further comprising dynamically varying a ratio of numbers of the narrow and wide tracks based on conditions of use.

18. The method of claim 12, further comprising writing the wide tracks and the narrow tracks in a plurality of bands, wherein each of the bands comprises n-overlapping tracks having n−1 of the narrow tracks and one of the wide tracks.

19. The method of claim 18, wherein at least two of the bands comprise different ratios of numbers of the narrow and wide tracks.

20. The method of claim 19, wherein the processor is further configured to dynamically vary the ratios based on conditions of use.

* * * * *